Sept. 2, 1941.   R. A. GILBERT   2,254,696

RESISTANCE WELDING ELECTRODE

Filed June 18, 1940

Inventor:
Ralph A. Gilbert,
by Harry E. Dunham
His Attorney.

Patented Sept. 2, 1941

2,254,696

UNITED STATES PATENT OFFICE 2,254,696

RESISTANCE WELDING ELECTRODE

Ralph A. Gilbert, Pittsfield, Mass., assignor to General Electric Company, a corporation of New York Application June 18, 1940, Serial No. 341,147

5 Claims. (Cl. 219—4)

My invention relates to resistance welding electrodes and their supports.

In certain manufacturing operations, it is frequently necessary in order to obtain a desired assembly to attach to a supporting member by resistance spot or projection welding a plurality of parts of different shape. Since each part to be welded may require an electrode having a work engaging surface portion conforming in configuration to the shape of the work part welded thereby, a plurality of welding machines have been employed in making the assembly or one welding machine has been used to attach all pieces of one configuration before changing the electrode and then attaching pieces of a different configuration to the supporting member. In one case a plurality of welding machines are required which is expensive because of the equipment involved and in the other case adequate storage facilities must be provided for the work parts whose speed of assembly is greatly reduced by reason of handling and storage requirements.

It has also been proposed to change welding electrodes between the welding operations by means of which parts of different configurations are attached to their supporting member. This has led to difficulties due to the time required for changing the electrodes and the difficulty of supplying current to such electrodes from their supports. Under most conditions of welding, grease, scale, dirt or paint collect on the electrodes and their support seriously interfering with the transmission of welding current from the support to the electrodes mounted therein. For example, in welding lugs and brackets of various shapes to a transformer casing where paint is applied between their contacting surfaces, some of this paint is transferred to the operator's hands or to the gloves he wears and thence to the removable electrodes and their support. This paint seriously interferes with the transmission of welding current from the support to the electrodes. At the same time, grease, scale and dirt which collect on the tanks and the operator's hands or gloves, are also transferred to the electrodes and their support and act in like manner to the paint in prohibiting satisfactory conduction of welding current between the electrodes and their support.

It is an object of my invention to provide a practical and efficient current conducting engagement between a quick-change resistance welding electrode and its support which will not be rendered ineffective by the collection of dirt, paint, grease or the like.

Figure 1:
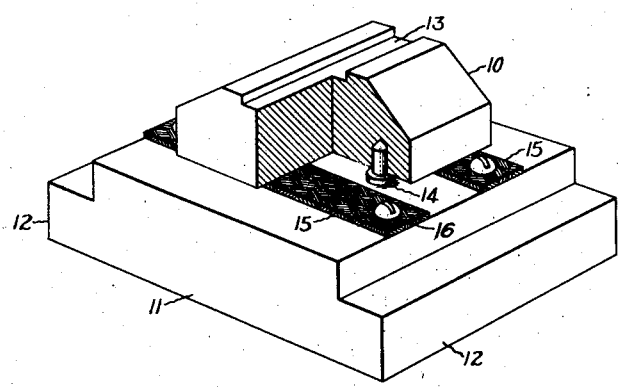
Figure 2:
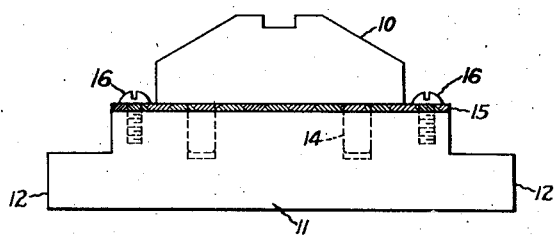
Figure 3:
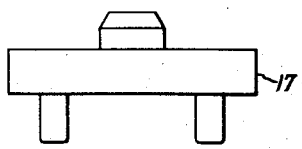

My invention will be better understood from a consideration of an embodiment thereof illustrated in the accompanying drawing in which Figs. 1 and 2 are respectively a sectional perspective view and an end view of a detachable electrode and its support, and Fig. 3 is an end view of another electrode which may be substituted for the electrode of Figs. 1 and 2 in the holder shown in these figures.

In Figs. 1 and 2 a quick-change electrode 10 is supported on a holder 11 provided with shoulder or flange portions 12 by which it is adapted to be mechanically attached to the frame of a welding machine and electrically connected to a suitable source of welding current. Pressure is also transmitted through the holder 11 to the electrode 10 supported thereon. The particular electrode illustrated is provided with a groove 13 for accommodating work parts which are to be welded thereby to a supporting member in making a desired welded assembly.

The electrode 10 is located in a predetermined desired welding position in its holder 11 by any suitable separable connection. In the arrangement illustrated, a plug and socket connection is employed, the electrode 10 being provided with two pins 14 which are inserted in sockets located in the holder 11.

Current and pressure is transmitted from the holder 11 to the electrode 10 through a cushion of stranded material 15. In the arrangement illustrated, this cushion of stranded material is a flattened wire braid which is attached to the holder by screws 16. Other forms of stranded material may be used in which a plurality of small wires are woven, interlaced, or entwined with one another to form a cushion of current conducting material between the electrode and its holder.

It will be noted that the pins 14 of electrode 10 are shorter than their sockets in holder 11. This permits relative movement of the electrode in the direction of welding pressure when due to this pressure the stranded material between the electrode and its holder is partly flattened by compression.

It has been found that stranded current conducting material located between the base portion of the electrode and the support portion of its electrode holder effectively transfers current and pressure from the holder to the electrode although grease, paint, dirt and the like may accumulate on the opposed surfaces of the electrode and its holder and on the stranded contact material inserted therebetween. Under the influence of the welding pressure applied to the electrode from its holder, the wires composing the stranded material apparently move relatively to one another and to the opposed surfaces of the electrode and its support in a manner to cut through the dirt, paint, grease and the like which accumulate on these opposed surfaces and on the cushion of stranded material. It has been found by experience that even though the stranded material is badly fouled by an accumulation of paint, dirt, grease and the like, current is effectively conducted from the holder to an electrode supported therein. The stranded material also serves as a pressure equalizer between the electrode and its holder. This pressure equalization no doubt accounts in large measure for the effectiveness of the electrical contact between the electrode and its support.

When using the construction illustrated in Figs. 1 and 2, the electrode 10 may be quickly removed from its holder 11 and another electrode 17 of Fig. 3 inserted in its place. Since more than two electrodes may be required in making a welded assembly, electrodes having other work engaging surface configurations may be employed. Thus, by using a plurality of interchangeable electrodes which are positioned relative to one another by a quick-change connection therebetween, any desired number of welding operations may be performed sequentially by merely changing the electrodes in accordance with the requirements of the welding operations to be performed.

Although the separable connection between the electrodes and their holder have been illustrated in the drawing as of the plug and socket type, it is, of course, apparent that other types of separable quick-change connections may be employed for locating the electrodes in their holder. In each case, however, the connection must provide for relative movement of the electrode and its support resulting from the flattening under welding pressure of the stranded contact material located therebetween. In some cases where the forces of gravity must be resisted, the quick-change locating connection between the electrode and its holder may be so constructed as to retain the electrode in its holder against the force of gravity. Latching or spring contact arrangements may be employed for this purpose.

The electrode and its support may be made of copper, cuprous alloys or metals of like nature which are suited for use as electrodes. For example, the copper-cobalt-beryllium alloys of United States Letters Patent No. 1,957,214, Edward H. Horstkotte, May 1, 1934, may be used. The cushion of stranded material may be made of copper braid and fastened to either the electrode or its holder by any suitable means. The screw attachment above described is considered preferable in that it makes it possible to renew these braids when badly worn or damaged.

In view of the above description of one embodiment of my invention, various modifications and variations thereof will occur to those skilled in the art. It is, consequently, my purpose in the following claims to cover all such variations and modifications which fall within the true spirit and scope of my invention.

What I claim as new and desire to secure by Letters Patent of the United States is:

1. A holder for supporting a plurality of electrodes one at a time in a desired welding position, and means including a plurality of entwined wires of current conducting material inserted between said holder and said electrodes supported thereby for transmitting current and pressure from said holder to said electrodes.

2. A current conducting holder for interchangeably supporting and locating a plurality of electrodes in a predetermined position relative thereto, and means for transmitting current and pressure from said holder to said electrodes supported therein, said means comprising a cushion of current conducting stranded material located between opposed surfaces of said electrodes and said holder.

3. A resistance welding electrode, a support therefor, means including a plurality of entwined wires of current conducting material inserted between said support and said electrode for transmitting welding current and pressure from said support to said electrode, and means locating said electrode in a predetermined welding position on said support for movement relative thereto under the influence of the welding pressure.

4. A quick-change resistance welding electrode, a current conducting support therefor, means including a strip of wire braid located between opposed surfaces of said electrode and said holder and attached to one of said surfaces for transmitting welding pressure and current to said electrode, and a plug and socket connection between said electrode and said support, said connection yielding in one direction under the influence of the welding pressure and being separable in the opposite direction.

5. A quick-change resistance welding electrode having a base portion through which current and pressure are transmitted to its work engaging surface portion, an electrode holder having for said base portion of said electrode a support portion through which current and pressure are transmitted to said electrode, a cushion of current conducting stranded material located between said base portion of said electrode and said support portion of said electrode holder, and a separable connection between said electrode and said holder which permits relative movement therebetween to accommodate the flattening of said cushion of stranded material upon the application of welding pressure thereto.

RALPH A. GILBERT.